J. Lefort,
Churn.
Nº 104,968.  Patented July 5, 1870.
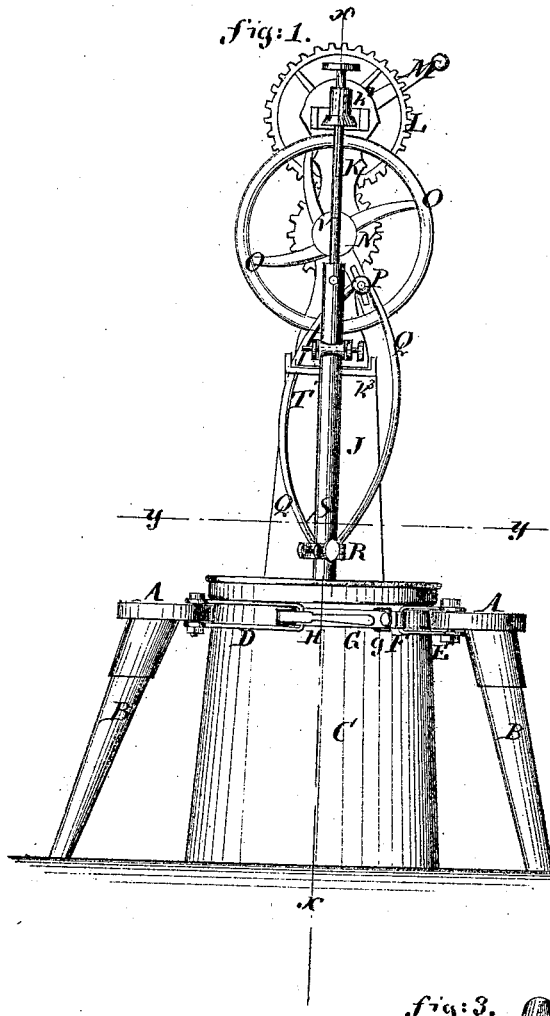
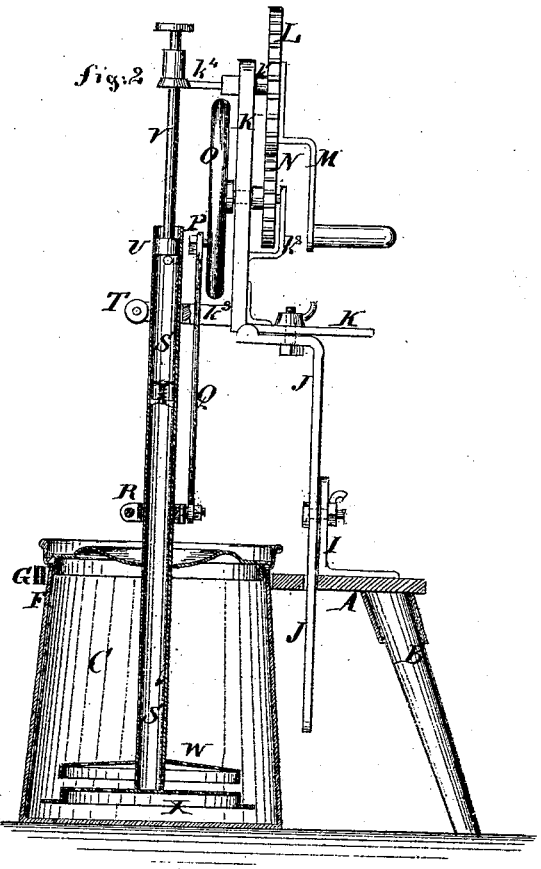
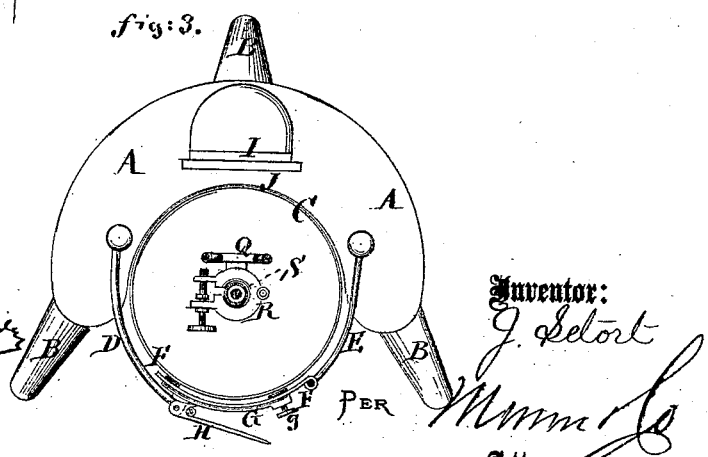
Witnesses:
M. Vorland
L. S. Mabee
Inventor:
J. Lefort
per Munn & Co
Attorneys.
N. PETERS, PHOTO-LITHOGRAPHER, WASHINGTON, D. C.

United States Patent Office.

JAMES LETORT, OF WYTHEVILLE, VIRGINIA.

Letters Patent No. 104,968, dated July 5, 1870.

IMPROVED CHURNING APPARATUS.

The Schedule referred to in these Letters Patent and making part of the same

*To all whom it may concern:*

Be it known that I, JAMES LETORT, of Wytheville, in the county of Wythe and State of Virginia, have invented a new and useful Improvement in Churning Apparatus; and I do hereby declare that the following is a full, clear, and exact description thereof, which will enable others skilled in the art to make and use the same, reference being had to the accompanying drawing forming part of this specification.

Figure 1 is a front view of my improved churning apparatus.

Figure 2 is a side view of the same, partly in section through the line $x$–$x$, fig. 1.

Figure 3 is a horizontal section of the same taken through the line $y$–$y$, fig. 1.

Similar letters of reference indicate corresponding parts.

My invention has for its object to furnish a simple, convenient, and effective churning apparatus, which shall be so constructed and arranged as to do its work quickly and thoroughly, and with a comparatively small outlay of power; and It consists in the construction and combination of the various parts of the apparatus, as hereinafter more fully described.

A is the platform or stool, which is cast with three sockets, to receive the legs B, said legs being so arranged that the two forward ones may be about upon a line with the forward side of the churn.

The stand or platform A is made semicircular upon its outer edge, and with a semicircular recess upon its inner edge, to receive the body C of the churn.

D E are two curved bars, rods, or wire loops, the outer ends of which are pivoted to the stand A.

To the free end of the rod, bar, or loop E is pivoted the end of the strap F, which passes through keepers attached to the strap G, so that the said straps may be extended or contracted, according to the size of the churn to be secured to the said stand.

The two straps F G are secured to each other, when adjusted, by means of a set-screw, $g'$, as shown in fig. 3.

To the strap G, at or near its end, is pivoted the end of the lever H, which has a hook formed upon it near its pivoted end.

In securing the churn-body C in place, the free end of the lever H is passed through the loop D, and is then turned outward and backward into the positions shown in figs. 1 and 3, securely locking the churn-body in place.

To the middle or rear part of the stand A is attached, or upon it is formed an upright arm, I, to which is secured, by a bolt and hand-nut, an upright, J, said bolt passing through a slot in the upright J, so that the said upright may be conveniently moved up or down, to adjust the apparatus to churns of different heights, the platform or stand A having a hole or socket formed in it, to receive the lower end of the said upright J.

The upper end of the upright J projects inward at right angles to form a seat for the outwardly-projecting lower end of the upright K, said horizontal parts of the said uprights being secured to each other by a bolt and hand-nut, said bolt passing through a slot in one or both of said parts, so that the said uprights K may be moved inward and outward, to adjust it according to the diameter of the churn-body.

The upright K is cast with an outwardly-projecting journal, K', upon the upper part of its outer side, to receive the gear-wheel L, which has a crank, M, formed upon or attached to its outer side.

The upright K is also cast with an arm, $K^2$, upon the lower part of its outer side, to form the bearing for the outer journal of the gear-wheel N, the teeth of which mesh into the teeth of the gear-wheel L.

The other journal of the gear-wheel N revolves in bearings in the upright K, projects through said upright, and to its end is attached the fly-wheel O.

One of the arms of the fly-wheel O is slotted, to receive the crank-pin P, which, when adjusted, is secured in place by a nut, so that the crank-pin P may be adjusted to give a longer or shorter stroke, according to the height of the churn, or the amount of cream to be churned.

Q is an elliptic connection, the upper end of which is pivoted to the crank-pin P, and its lower end is pivoted to the clamp R, one of the arms of which is hinged, and which is secured to the dasher-handle S, by a screw, which is swiveled to one arm and screws into the other arm of the said clamp, as shown in figs. 1 and 2.

$K^3$ is a forked rest or guide, which is cast upon the lower part of the inner or forward side of the upright K, and between the ends or in the fork of which the dasher-handle S moves up and down, the friction being relieved by the small concave roller T, pivoted to the ends of the arms of the guide $K^3$, as shown in figs. 1 and 2.

The guide $K^3$ passes through the elliptic connection Q, the peculiar form of which prevents its action from being interfered with by the said guide $K^3$.

The dasher-handle S is made hollow, and its upper part moves up and down upon the stationary piston U, the upper end of the piston-rod V of which is attached to a projecting arm, $K^4$, cast upon the upper part of the forward side of the upright K.

The air enters the dasher-handle S, through holes in the sides of the upper part of said handle, and is forced into and through the cream by the upward and downward movement of the dasher-handle.

To the lower end of the dasher-handle S are attached two perforated disks, W X, at a short distance apart, which are flanged around their outer edges, as shown in fig. 2.

The egress-openings for the escape of the air into the cream are formed in the sides of the dasher-handle S, between the two disks W X, and by the action of said disks is distributed through all parts of the cream, the peculiar form of said disks, in connection with the air, giving a double roll to the cream, bringing the butter in a shorter time, in better quality, and greater quantity than is possible with churns constructed in the ordinary manner.

Having thus described my invention,

I claim as new and desire to secure by Letters Patent—

The adjustable device D E F G H, for securing the churn-body to the recessed stand A, said device being constructed and operating substantially as herein shown and described, and for the purpose set forth.

JAMES LETORT.

Witnesses:
 I. W. TARTER,
 C. L. FOX.